(12) United States Patent
Faruque et al.

(10) Patent No.: US 10,286,872 B2
(45) Date of Patent: May 14, 2019

(54) ENERGY-ABSORBING RESTRAINT SYSTEM

(71) Applicant: Ford Global Technologies, LLC, Dearborn, MI (US)

(72) Inventors: Mohammed Omar Faruque, Ann Arbor, MI (US); Dean M. Jaradi, Macomb, MI (US); Saeed David Barbat, Novi, MI (US); James Chih Cheng, Troy, MI (US); Robert William McCoy, Ann Arbor, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/585,661

(22) Filed: May 3, 2017

(65) Prior Publication Data
US 2018/0319361 A1 Nov. 8, 2018

(51) Int. Cl.
| *B60R 22/28* | (2006.01) |
| *B60R 22/22* | (2006.01) |
| *B60R 22/18* | (2006.01) |

(52) U.S. Cl.
CPC .............. *B60R 22/28* (2013.01); *B60R 22/22* (2013.01); *B60R 2022/1806* (2013.01); *B60R 2022/281* (2013.01); *B60R 2022/282* (2013.01)

(58) Field of Classification Search
CPC ......... B60R 22/22; B60R 22/24; B60R 22/26; B60R 22/28; B60R 22/281; B60R 22/282; B60R 2022/1806; B60R 2022/281; B60R 2022/282

USPC ................ 280/805; 242/379.1; 297/470, 471
See application file for complete search history.

(56) References Cited

U.S. PATENT DOCUMENTS

| 4,441,738 A * | 4/1984 | Tsuge .................. B60R 22/1955 280/806 |
| 5,568,940 A * | 10/1996 | Lane, Jr. ............. B60R 22/1952 180/268 |
| 6,302,346 B1 * | 10/2001 | Brown .................... B60R 22/28 242/371 |
| 7,828,331 B2 | 11/2010 | Jessup et al. |
| 9,009,932 B2 | 4/2015 | Thorbole et al. |

(Continued)

FOREIGN PATENT DOCUMENTS

| CN | 104228622 A | 12/2014 |
| CN | 104228929 B | 12/2017 |

(Continued)

OTHER PUBLICATIONS

GB Search Report dated Oct. 31, 2018 re GB Appl. No. 1807228.0.

*Primary Examiner* — Ryan D Kwiecinski
(74) *Attorney, Agent, or Firm* — Frank A. MacKenzie; Bejin Bieneman PLC

(57) ABSTRACT

A restraint system includes a housing and a rotor engaged with the housing. The housing and the rotor define a cavity therebetween. A resilient material is disposed in the cavity. A helical interface is between the housing and the rotor. The rotor is moveable relative to the housing along the helical interface. A seat belt buckle is connected to and moveable relative to one of the housing and the rotor. During a vehicle impact, the seat belt buckle may cause the rotor to move along the helical interface towards the housing. In this situation, the resilient material may be compressed between the rotor and the housing.

21 Claims, 7 Drawing Sheets

(56) References Cited

U.S. PATENT DOCUMENTS

| | | | |
|---|---|---|---|
| 2002/0134877 A1* | 9/2002 | Glinka | B60R 22/3413 |
| | | | 242/379.1 |
| 2003/0111310 A1 | 6/2003 | Renton et al. | |
| 2004/0217583 A1* | 11/2004 | Wang | B60R 22/03 |
| | | | 280/805 |
| 2006/0249946 A1 | 11/2006 | Bachmann et al. | |
| 2009/0085340 A1 | 4/2009 | Harda et al. | |
| 2010/0007125 A1* | 1/2010 | Jessup | B60R 22/3413 |
| | | | 280/805 |
| 2015/0329076 A1 | 11/2015 | Biller et al. | |
| 2016/0114762 A1 | 4/2016 | Landbeck et al. | |
| 2018/0179357 A1* | 6/2018 | Lu | C08J 9/008 |

FOREIGN PATENT DOCUMENTS

| | | | | |
|---|---|---|---|---|
| DE | 102004051415 A1 | | 4/2006 | |
| FR | 2287924 A1 | | 5/1976 | |
| KR | 20000038318 A | | 7/2000 | |
| WO | WO-2010020422 A1 * | 2/2010 | | B60R 22/28 |

* cited by examiner

ENERGY-ABSORBING RESTRAINT SYSTEM

BACKGROUND

Vehicles include seatbelts for each of the seats onboard. The seatbelt includes webbing that, when the seatbelt is buckled, stretches across an occupant of the seat. An anchor attaches one end of the webbing to a seat frame. The other end of the webbing feeds into a retractor, which includes a spool that pays out and retracts the webbing. A clip slides freely along the webbing and, when engaged with a buckle, divides the webbing into a lap band and a shoulder band.

DETAILED DESCRIPTION

A restraint system includes a housing and a rotor engaged with the housing. The housing and the rotor define a cavity therebetween. A helical interface is between the housing and the rotor. The rotor is moveable relative to the housing along the helical interface. A resilient material is disposed in the cavity. A seat belt buckle is connected to and moveable relative to one of the housing and the rotor.

The restraint system may include a cable extending from the seat belt buckle to one of the housing and the rotor. The cable may be connected to both the seat belt buckle and one of the housing and the rotor. The rotor may include a circumference. The cable may be wrapped around the circumference of the rotor in a standard position. The cable may be unwound from the circumference of the rotor in an impact position.

The restraint system may include a bracket supporting both the housing and the rotor. The rotor may be moveable relative to the bracket. The bracket may include a first side and a second side spaced from each other. The second side may include a hole sized to receive the rotor. The housing may be disposed between the first side and the second side of the bracket. The housing may be fixed to the first side of the bracket. The rotor may extend through the hole of the second side of the bracket to the housing. The rotor may be moveable relative to the hole of the second side of the bracket.

The restraint system may include a seat. The bracket may be fixed to the seat.

The restraint system may include a vehicle body. The bracket may be fixed to the vehicle body.

The helical interface may include threads disposed on both the housing and the rotor. The threads of the housing and the threads of the rotor may be engageable with each other.

The housing may include a tube extending annularly about an axis. The cavity may extend circumferentially about the tube. The helical interface may be disposed in the cavity on the tube of the housing.

The resilient material may include a liquid and a hydrophobic nanoporous material in the liquid. The resilient material may abut both the rotor and the housing in the cavity.

The restraint system may include an O-ring disposed in the cavity. The O-ring may abut both the rotor and the housing. The O-ring may be disposed between the resilient material and the helical interface.

The restraint system may include a webbing engageable with the seat belt buckle.

Figure 2A:
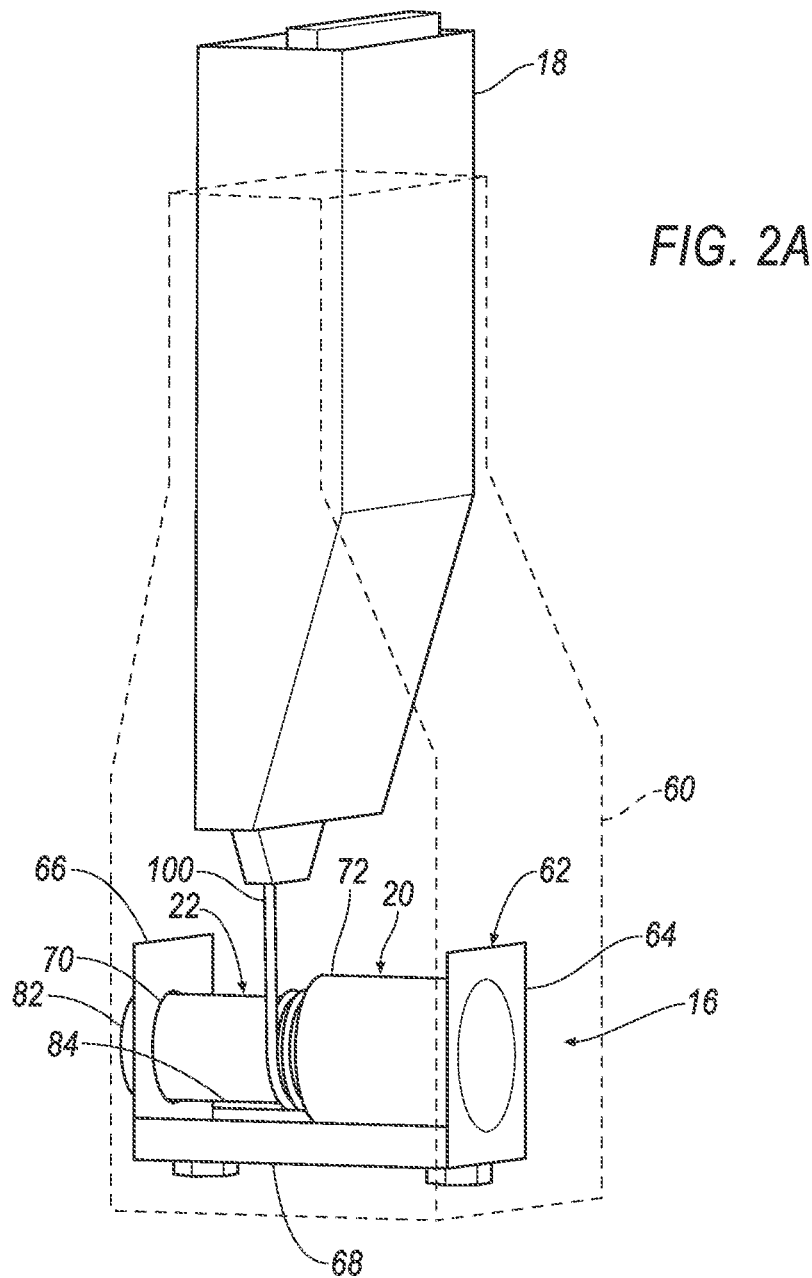
FIG. 2A is a perspective view of a seatbelt buckle in a standard position attached to a device including a housing, a rotor engaged with the housing, and a bracket supporting both the housing and the rotor.
Figure 2B:
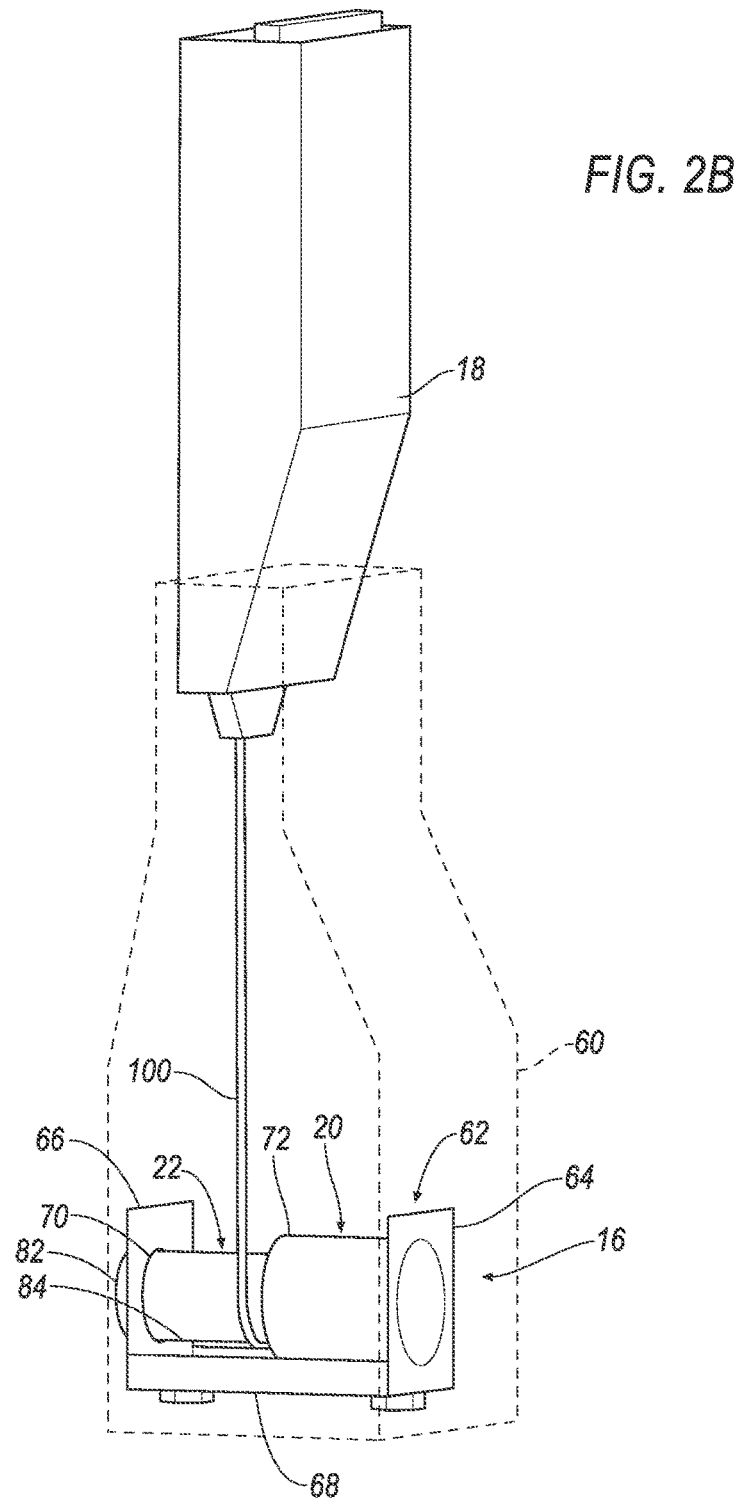
FIG. 2B is a perspective view of the seat belt buckle in an impact position attached to the device.

With reference to the Figures, wherein like numerals indicate like parts throughout the several views, a vehicle 10 is generally shown. The vehicle 10 includes a seat 12 and a restraint system 14 having a device 16 and a seat belt buckle 18 engaged with the device 16. During a vehicle impact, the momentum of an occupant biases the occupant relative to the seat 12. For example, in a front impact or a rear impact, the momentum of the occupant may bias the occupant away from or toward the seat 12, respectively. When the occupant moves away from the seat 12 during a front impact, the restraint system 14 may exert a force on the occupant to retain the occupant on the seat 12. During a front impact, the seat belt buckle 18 may be moveable from a standard position, as shown in FIG. 2A, to an impact position, as shown in FIG. 2B, to allow for load-limiting when the restraint system 14 retains the occupant in the seat 12. Specifically, the belt buckle may release to give a limited amount of slack to webbing 50 of the restraint system 14 during high loads to, as described below, reduce chest compression of the occupant during the vehicle impact. During this release, the restraint system 14 may absorb energy to decrease the force exerted on the chest of the occupant during the vehicle impact.

The restraint system 14 includes a housing 20 and a rotor 22 engaged with the housing 20. The housing 20 and the rotor 22 define a cavity 24 therebetween, and a resilient material 26 is disposed in the cavity 24. The restraint system 14 includes a helical interface 28 between the housing 20 and the rotor 22, and the rotor 22 is moveable relative to the housing 20 along the helical interface 28. The seat belt buckle 18 connected to and moveable relative to one of the housing 20 and the rotor 22. As the seat belt buckle 18 moves from the standard position to the impact position, the seat belt buckle 18 causes the rotor 22 to move relative to the housing 20. When the rotor 22 moves relative to the housing 20, the resilient material 26 is compressed between the rotor 22 and the housing 20. By allowing the seat belt buckle 18 to move relative to one of the rotor 22 and the housing 20, i.e., the device 16, the resilient material 26 absorbs energy from the occupant and may chest compression of the occupant during the vehicle impact.

Figure 1:
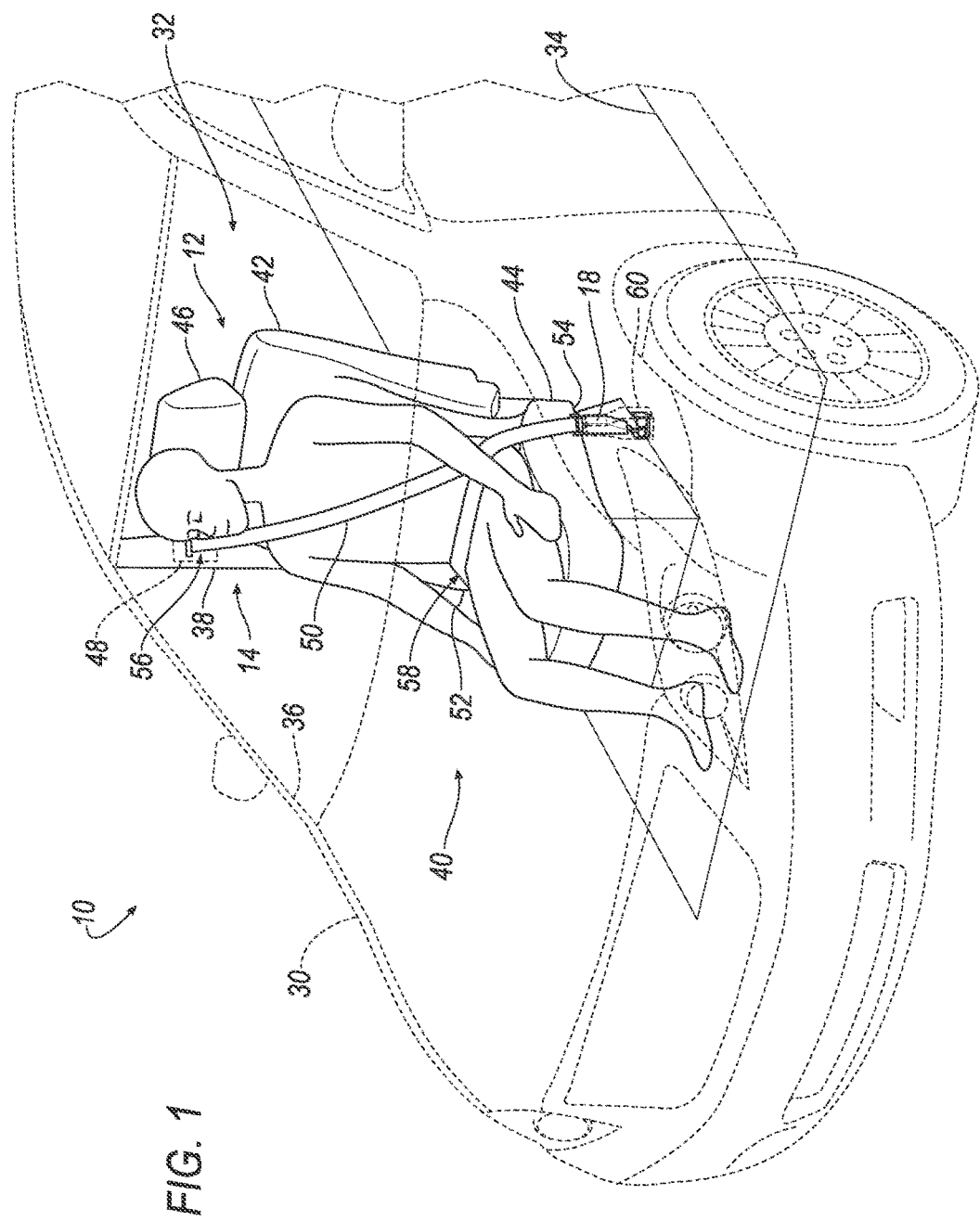
FIG. 1 is a perspective view of a vehicle including a restraint system.

The vehicle 10 may, for example, be any suitable type of automobile. The vehicle 10 may include a vehicle body 30 defining a passenger cabin 32 to house occupants, if any, of the vehicle 10. The vehicle body 30 may include a floor 34 and a plurality of pillars 36, 38 extending in an upward direction from the floor 34. For example, the pillars 36, 38 may include an A-pillar 36 and a B-pillar 38 spaced from the A-pillar 36, as shown in FIG. 1. The pillars 36, 38 may include additional pillars, e.g., a C-pillar (not shown).

With reference to FIG. 1, one or more seats 12 may be disposed at a front 40 of the passenger cabin 32, e.g., between the A-pillar 36 and the B-pillar 38. In this situation, the seats 12 may be front seats. The passenger cabin 32 may include one or more rear seats (not shown) disposed behind the front seats. The passenger cabin 32 may also include third-row seats (not shown) at a rear (not numbered) of the passenger cabin 32, in which case the seats 12 may be second-row seats (not numbered) instead of or in addition to being front seats. As shown in FIG. 1, the seat 12 is a bucket seat, but the seats 12 may be other suitable types of seats, e.g., a bench seat.

With continued reference to FIG. 1, the seats 12 may include a seatback 42, a seat bottom 44, and a head restraint 46. The head restraint 46 may be supported by the seatback 42 and may be stationary or movable relative to the seatback 42. The seatback 42 may be supported by the seat bottom 44 and may extend upwardly from the seat bottom 44. The seatback 42 may be stationary or movable relative to the seat bottom 44. The seatback 42, the seat bottom 44, and/or the head restraint 46 may be adjustable in multiple degrees of freedom. Specifically, the seatback 42, the seat bottom 44, and/or the head restraint 46 may themselves be adjustable, in other words, may have adjustable components within themselves, and/or may be adjustable relative to each other.

The seats 12 may be supported on the floor 34, i.e., directly on or through intermediate components. The seats 12 may, for example, be fixed to the floor 34 of the vehicle 10. In other words, the seat bottom 44 may be fixed to the floor 34. Alternatively, the seats 12, i.e., the seat bottom 44, may be slideably coupled to a support member (not shown) that is fixed to the floor 34. The seats 12 may be secured to the floor 34 of the vehicle 10 in any suitable manner, e.g., fasteners.

With reference to FIG. 1, the restraint system 14 may include a retractor 48, webbing 50 retractably payable from the retractor 48, an anchor 52 coupled to the webbing 50, and a clip 54 that engages the seat belt buckle 18. The restraint system 14 may be disposed adjacent the seat 12. For example, the restraint system 14 is adjacent the front seat, as shown in FIG. 1. The restraint system 14, when fastened, retains the occupant on the seat 12, e.g., during sudden decelerations of the vehicle 10.

The retractor 48 may be attached to the vehicle body 30. For example, the retractor 48 may be attached to the B-pillar 38, as shown in FIG. 1. As another example, when the restraint system 14 is adjacent the rear seat, the retractor 48 may be attached to the C-pillar. Alternatively, the retractor 48 may be attached to the front seat, e.g., a frame (not shown) of the front seat. The retractor 48 may be attached to the vehicle body 30 in any suitable manner, e.g., fasteners.

The retractor 48 may include a locked state and an unlocked state. The retractor 48 in the locked state locks the webbing 50 to prevent the webbing 50 from extending from the retractor 48. In the unlocked state, the webbing 50 is selectively extendable from the retractor 48. The retractor 48 may, for example, be in the unlocked state by default, i.e., in the absence of a sudden deceleration. In other words, the retractor 48 may change from the unlocked state to the locked state during a sudden deceleration of the vehicle 10, i.e., the deceleration triggers components of the retractor 48 to change from the unlocked state to the locked state.

With reference to FIG. 1, the webbing 50 may include a first end 56 and a second end 58. The first end 56 of the webbing 50 is retractably engaged with the retractor 48, i.e., feeds into the retractor 48. The second end 58 of the webbing 50 may be attached to the anchor 52. The anchor 52 may, for example, be attached to the seat 12, e.g., the seat bottom 44. Alternatively, the anchor 52 may be attached to the vehicle body 30, e.g., the B-pillar 38, the floor 34, etc. The anchor 52 may be attached to the seat 12 in any suitable manner, e.g., with fasteners.

The webbing 50 extends continuously from the first end 56 to the second end 58. In other words, the webbing 50 is a one-piece unit from the first end 56 to the second end 58, and is not separable in a nondestructive manner between the first end 56 and the second end 58. The webbing 50 may be formed of a woven fabric, e.g., woven nylon.

The clip 54 may be engaged with the webbing 50. The clip 54 may, for example, slide freely along the webbing 50 and selectively engage with the seat belt buckle 18. In other words, the webbing 50 may be engageable with the seat belt buckle 18. For example, the clip 54 may be selectively engageable with the seat belt buckle 18 from a buckled position to an unbuckled position. In the buckled position, the seat belt buckle 18 may prevent the clip 54 from moving relative to the buckle. In other words, the seat belt buckle 18 may prevent the webbing 50 from retracting into the retractor 48. In this situation, during the vehicle impact, the webbing 50 may pull the seat belt buckle 18 from the standard position to the impact position. When the clip 54 is engaged with the seat belt buckle 18, i.e., in the buckled position, the clip 54 may divide the webbing 50 into a lap band and a shoulder band. In the unbuckled position, the clip 54 may move relative to the buckle. In other words, the webbing 50 may be retractable into the retractor 48.

The restraint system 14 may include a D-ring (not shown) engaged with the webbing 50. For example, the webbing 50 may freely slide through the D-ring. The D-ring may be disposed between the clip 54 and the retractor 48. The D-ring may be fixed to the vehicle body 30, e.g., the B-pillar 38. For example, the retractor 48 may be fixed to the B-pillar 38 between the D-ring and the floor 34. In other words, the webbing 50 may extend from the retractor 48 through the D-ring to the anchor 52.

The restraint system 14 may include a pretensioner (not shown) for applying tension to the webbing 50 during the vehicle impact. The pretensioner removes slack from the webbing 50 to pull the occupant into the seat 12, i.e., exert the force on the occupant to retain the occupant on the seat 12. The pretensioner may be connected to any suitable component of the restraint system 14. For example, the pretensioner may be connected to the retractor 48. Alternatively, the pretensioner may be connected to the anchor 52, the seat belt buckle 18, or any other suitable component of the restraint system 14. The pretensioner may be connected to any component of the restraint system 14 in any suitable manner, e.g., fasteners, welding, ultrasonic welding, etc.

With reference to FIG. 1, the restraint system 14 may include a buckle support 60 spaced from the anchor 52. For example, the seat 12 may be disposed between the buckle support 60 and the anchor 52. In other words, the buckle support 60 and the anchor 52 may be disposed on opposite sides of the seat 12. The buckle support 60 may be disposed adjacent the seat 12, e.g., the seat bottom 44. The buckle support 60 may, for example, be attached to the floor 34 of the vehicle 10. The buckle support 60 may extend upwardly from the floor 34. Alternatively, the buckle support 60 may be attached to the seat bottom 44 of the seat 12. The buckle support 60 may be formed of any suitable material, e.g., metal, plastic, etc. The buckle support 60 may be attached to the floor 34 of the vehicle 10 in any suitable manner, e.g., fasteners, welding, adhesive, etc.

With reference to FIGS. 2A-2B, the seat belt buckle 18 may be housed by the buckle support 60, e.g., the buckle support 60 may extend around the seat belt buckle 18. In other words, the buckle support 60 may support the seat belt buckle 18 in both the standard position and the impact position. The seat belt buckle 18 may be partially disposed in the buckle support 60. For example, the seat belt buckle 18 may extend outwardly from the buckle support 60, i.e., in the upward direction from the floor 34. The seat belt buckle 18 may be moveable relative to the buckle support 60. For example, the seat belt buckle 18 may slide relative to the buckle support 60 from the standard position to the impact position. The seat belt buckle 18 may extend farther upwardly from the buckle support 60 in the impact position than in the standard position.

With reference to FIG. 1, the seat belt buckle 18 may be disposed in any suitable position relative to the seat bottom 44. For example, the seat belt buckle 18 may be disposed below the seat bottom 44. In other words, the seat belt buckle 18 may be disposed between the seat bottom 44 and the floor 34 of the vehicle 10. Alternatively, the seat belt buckle 18 may extend partially above the seat bottom 44. In other words, the seat bottom 44 may be disposed between a portion of the seat belt buckle 18 and the floor 34 of the vehicle 10.

The restraint system 14 may be a three-point harness, as shown in FIG. 1, meaning that the webbing 50 is attached at three points around the occupant when fastened: the anchor 52, the retractor 48, and the seat belt buckle 18. The restraint system 14 may, alternatively, include another arrangement of attachment points.

Figure 4:
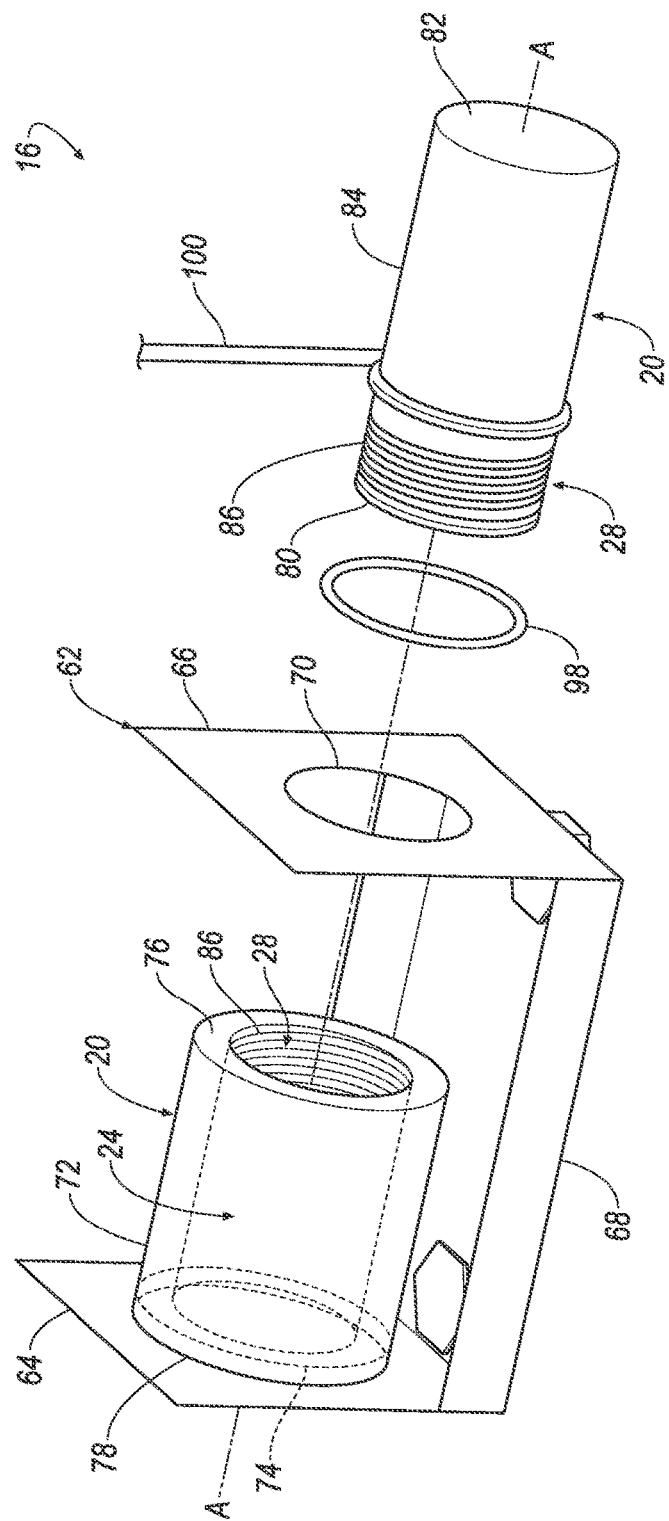
FIG. 4 is an exploded view of the device including an O-ring disposed between the housing and the rotor.

With reference to FIG. 4, the device 16 may include a bracket 62 supporting both the housing 20 and the rotor 22. The bracket 62 may include a first side 64 and a second side 66 spaced from each other along an axis A. A base 68 may extend from the first side 64 to the second side 66, i.e., along the axis A. The first side 64 and the second side 66 may extend transverse to the axis A, i.e., the base 68.

With continued reference to FIG. 4, the second side 66 of the bracket 62 may include a hole 70. The hole 70 may extend through the second side 66 of the bracket 62. The hole 70 may be designed to receive the rotor 22. In other words, the hole 70 may be sized, shaped, and positioned to receive the rotor 22. The hole 70 may extend circumferentially about the axis A.

The bracket 62 may be fixed to any suitable component of the vehicle 10. For example, the bracket 62, i.e., the base 68, may be fixed to the vehicle body 30, e.g., the floor 34, the B-pillar 38, etc. As another example, the bracket 62, i.e., the base 68, may be fixed to the seat 12, e.g., the seat bottom 44. The bracket 62 may be fixed to any suitable component of the vehicle 10 in any suitable manner, e.g., fasteners, welding, etc.

With reference to FIG. 4, the housing 20 may include a tube 72 extending from a first end 74 to a second end 76. The first end 74 and the second end 76 of the tube 72 may be spaced from each other along the axis A. The tube 72 may extend annularly about the axis A. In other words, the first end 74 and the second end 76 of the tube 72 may extend annularly about the axis A. The tube 72, i.e., the first end 74 and the second end 76, may be designed to receive the rotor 22. In other words, the tube 72 may be sized, shaped, and positioned to receive the rotor 22. For example, the tube 72 may be aligned with the hole 70 of the second side 66 of the bracket 62. The housing 20, i.e., the tube 72, may have a constant cross-section along the axis A. The housing 20, i.e., the tube 72, may, for example, have a circular cross-section.

Figure 3A:
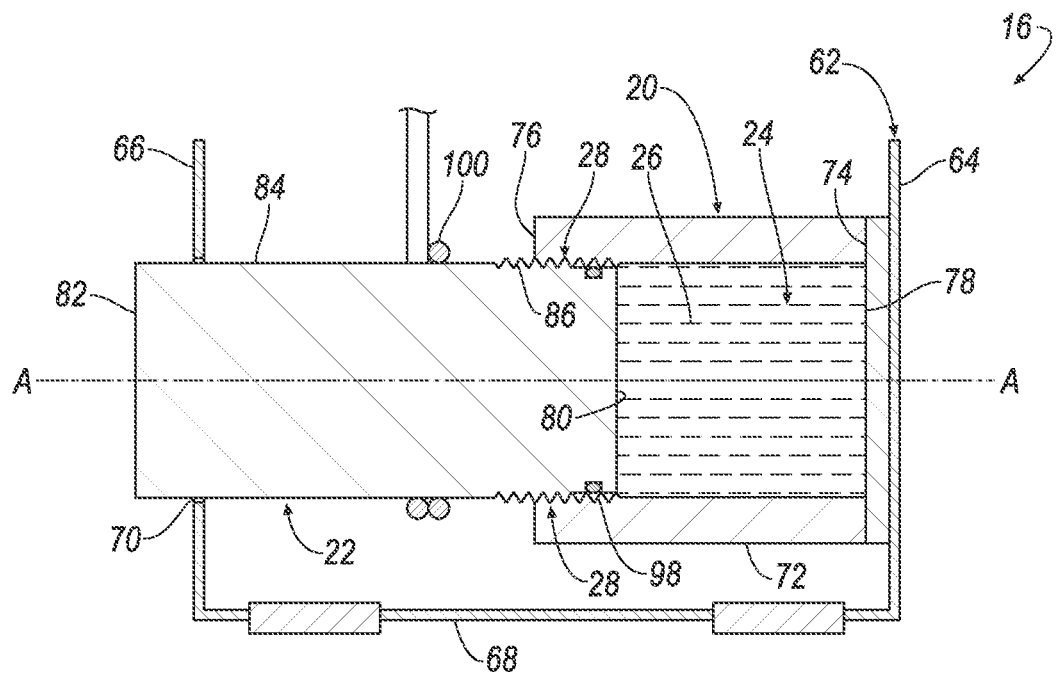
FIG. 3A is a cross sectional view along an axis of the device with a resilient material in an uncompressed state.
Figure 3B:
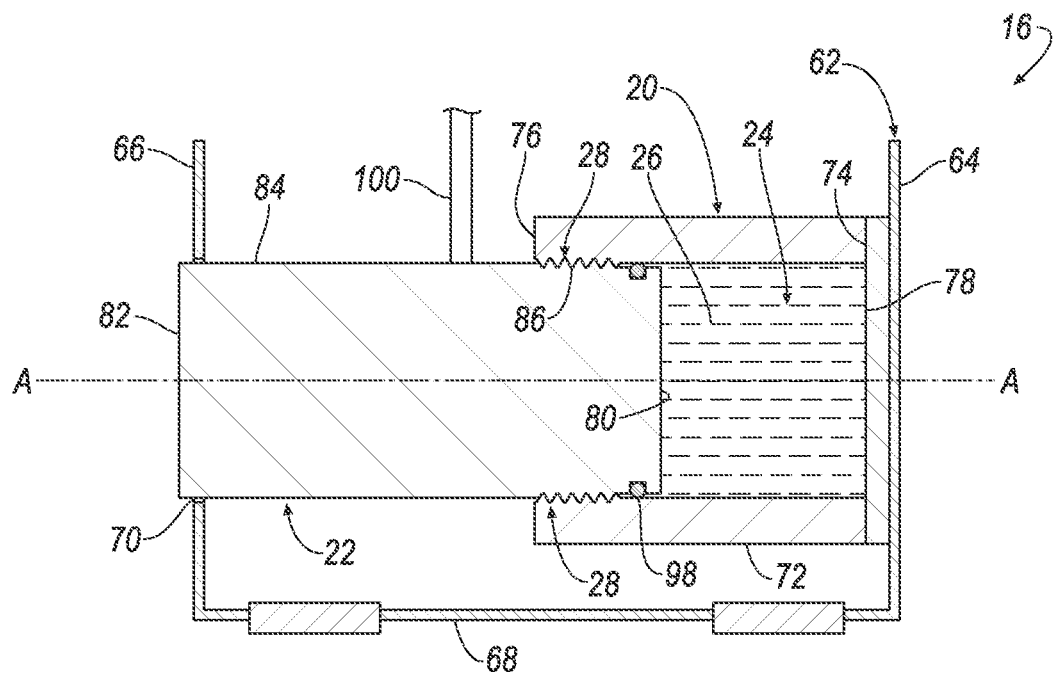
FIG. 3B is a cross sectional view along the axis of the device with the resilient material in a compressed state.

The housing 20 may include a wall 78 at one end of the tube 72, as shown in FIGS. 3A-3B. The wall 78 may have a circular shape and may enclose one end of the tube 72. For example, the wall 78 may enclose the first end 74 of the tube 72.

The housing 20 may be disposed between the first side 64 and the second side 66 of the bracket 62, as shown in FIGS. 2A-4. For example, the housing 20 may extend from the first side 64 of the bracket 62 towards the second side 66 of the bracket 62. In other words, the first end 74, i.e., the wall 78, of the tube 72 may be disposed adjacent the first side 64 of the bracket 62, and the second end 76 of the tube 72 may be spaced from the first side 64 and the second side 66 of the bracket 62.

The housing 20 may be fixed to the bracket 62. Specifically, the housing 20 may be fixed to the first side 64 of the bracket 62. For example, the wall 78 may be fixed to the first side 64 of the bracket 62. The housing 20, i.e., the wall 78, may be fixed to the bracket 62 in any suitable manner, e.g., fasteners, welding, adhesive, etc.

The rotor 22 may include an inner surface 80 and an outer surface 82 spaced from each other along the axis A, as shown in FIGS. 3A-3B. The rotor 22 may extend from the inner surface 80 to the outer surface 82 along the axis A. The inner surface 80 and the outer surface 82 of the rotor 22 may each be circular shaped. In other words, the rotor 22 may be cylindrical shaped, as shown in FIG. 4. The rotor 22 may, for example, include a circumference 84 extending about the axis A. In other words, the rotor 22 may have a circular cross-section with a diameter slightly smaller than a diameter of the cavity 24. Additionally, the diameter of the rotor 22 may be slightly smaller than a diameter of the hole 70 of the second side 66 of the bracket 62.

With reference to FIGS. 3A-3B, the rotor 22 may be partially disposed in the housing 20, i.e., the tube 72. The inner surface 80 of the rotor 22, for example, may be disposed between the first end 74 and the second end 76 of the tube 72. The outer surface 82 of the rotor 22, for example, may be spaced from the second end 76 of the tube 72 along the axis A. In other words, the second end 76 of the tube 72 may be disposed between the inner surface 80 and the outer surface 82 of the rotor 22. The inner surface 80 of the rotor 22 may be disposed at any suitable position along the axis A between the first end 74 and the second end 76 of the tube 72. In other words, the rotor 22 may extend any suitable amount along the axis A into the housing 20, i.e., the tube 72.

With continued reference to FIGS. 3A-3B, the rotor 22 may extend from the housing 20 through the hole 70 of the second side 66 of the bracket 62. For example, the second side 66 of the bracket 62 may be between the outer surface 82 of the rotor 22 and the second end 76 of the tube 72. The rotor 22 may extend through the hole 70 any suitable amount along the axis A. The rotor 22 is moveable relative to the hole 70 of the second side 66 of the bracket 62 from a first position, as shown in FIG. 3A, to a second position, as shown in FIG. 3B. The rotor 22 may be rotationally and translationally moveable relative to the hole 70 of the second side 66 of the bracket. For example, the rotor 22 may rotate about the axis A relative to the hole 70 when the seat belt buckle 18 moves the rotor 22. Additionally, the rotor 22 may move fore-and-aft along the axis A relative to the hole 70 when the seat belt buckle 18 moves the rotor 22.

The rotor 22 and the housing 20 may be formed of a same or different material. The rotor 22 and the housing 20 may be formed of any suitable material. For example, the rotor 22 and the housing 20 may be formed of any suitable metal, e.g., steel, aluminum, etc. Alternatively, the rotor 22 and the housing 20 may be formed of plastic or any other suitable material.

The cavity 24 may be in the tube 72 of the housing 20. The cavity 24 may, for example, extend circumferentially along the tube 72, as shown in FIG. 4. Additionally, the cavity 24 may be between the wall 78 of the housing 20 and the inner surface 80 of the rotor 22. The cavity 24 may, for example, extend along the axis A from the wall 78 of the housing 20 to the inner surface 80 of the rotor 22. The cavity 24 may have a constant cross-section along the axis A. For example, the cavity 24 may have a circular cross-section.

The helical interface 28 is between the housing 20 and the rotor 22, as set forth above. The rotor 22 is moveable relative to the housing 20 along the helical interface 28 from the first position to the second position. In other words, the rotor 22 is moveable relative to both the housing 20 and the hole 70 of the second side 66 of the bracket. The rotor 22 may be rotationally and translationally moveable relative to the housing 20 along the helical interface 28. For example, the rotor 22 may rotate about the axis A relative to the housing 20 when the seat belt buckle 18 moves the rotor 22. Additionally, the rotor 22 may move fore-and-aft along the axis A relative to the housing 20 when the seat belt buckle 18 moves the rotor 22.

With reference to FIGS. 3A-4, the helical interface 28 may be disposed in the cavity 24. The helical interface 28, for example, may be on the tube 72 of the housing 20. For example, the helical interface 28 may extend along the axis A from the second end 76 of tube 72 towards the first end 74 of the tube 72, i.e., the wall 78, in the cavity 24. Additionally, the helical interface 28 may be on the circumference 84 of the rotor 22. For example, the helical interface 28 may be spaced from both the inner surface 80 and the outer surface 82 of the rotor 22 and extend any suitable amount along the axis A.

The helical interface 28 may include any suitable interface. For example, the helical interface 28 may include threads 86 disposed on both the housing 20 and the rotor 22, as shown in FIGS. 3A-4. The threads 86 of the rotor 22 and the threads 86 of the housing 20 may be engageable with each other. In other words, the threads 86 of the rotor 22 may be designed to receive, i.e., mesh, with the threads 86 of the housing 20. The threads 86 of the rotor 22 may, for example, move helically about the axis A along the threads 86 of the housing 20 when the seat belt buckle 18 moves the rotor 22. As another example, the helical interface 28 may include a groove (not shown) and a tongue (not shown) disposed in the groove. The groove may extend helically around one of the rotor 22 and the housing 20 and the tongue may be disposed on the other of the rotor 22 and the housing 20. In this situation, the tongue may move within the groove rotationally about the axis A and translationally along the axis A when the seat belt buckle 18 moves the rotor 22. In other words, the tongue may move helically about the axis A in the groove.

With reference to FIGS. 3A-3B, the resilient material 26 is enclosed by the rotor 22 in the housing 20, i.e., in the cavity 24. In other words, the housing 20 and the rotor 22 contain the resilient material 26 and prevent the resilient material 26 from freely flowing out of the cavity 24. The resilient material 26 may fill the cavity 24; in other words, the cavity 24 may contain only the resilient material 26. For example, the resilient material 26 may abut both the rotor 22 and the housing 20 in the cavity 24. The resilient material 26 may be compressible between the housing 20 and the rotor 22 from an uncompressed state, as shown in FIG. 3A, to a compressed state, as shown in FIG. 3B. For example, the resilient material 26 may be compressed by the inner surface 80 of the rotor 22 and the wall 78 of the housing 20 when the rotor 22 moves from the first position to the second position.

Figure 5A:
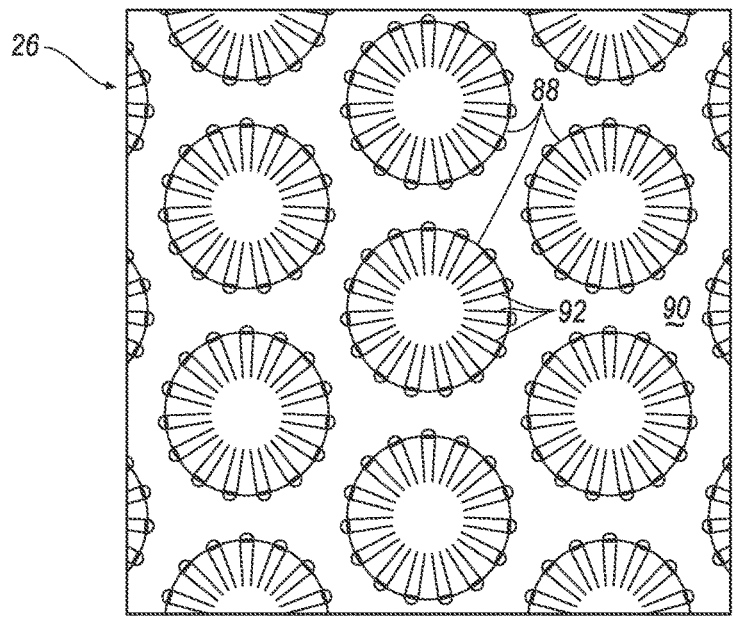
FIG. 5A is a diagram of the resilient material in the uncompressed state.

With reference to FIGS. 5A, the resilient material 26 includes hydrophobic nanoporous particles 88 and a liquid 90. The resilient material 26 is made of different substances that remain separate, e.g., a colloid or a suspension. For example, the resilient material 26 may be a colloid of the hydrophobic nanoporous particles 88 in the liquid 90. The liquid 90 may be any inert, i.e., nonreactive, liquid, e.g., water, lithium chloride, etc.

The particles 88 are nanoporous; in other words, the particles 88 have nanopores 92. The nanopores 92 may have diameters on the order of 1 nm to 100 nm. The particles 88 may be formed of, e.g., silicon. The particles 88 are hydrophobic, that is, tending to repel water or fail to mix with water. The particles 88 may be formed of a material that is hydrophobic, or the particles 88 may have a hydrophobic surface treatment, e.g., chlorotrimethylsilane or chlorodimethyloctylsilane in toluene.

Figure 6:
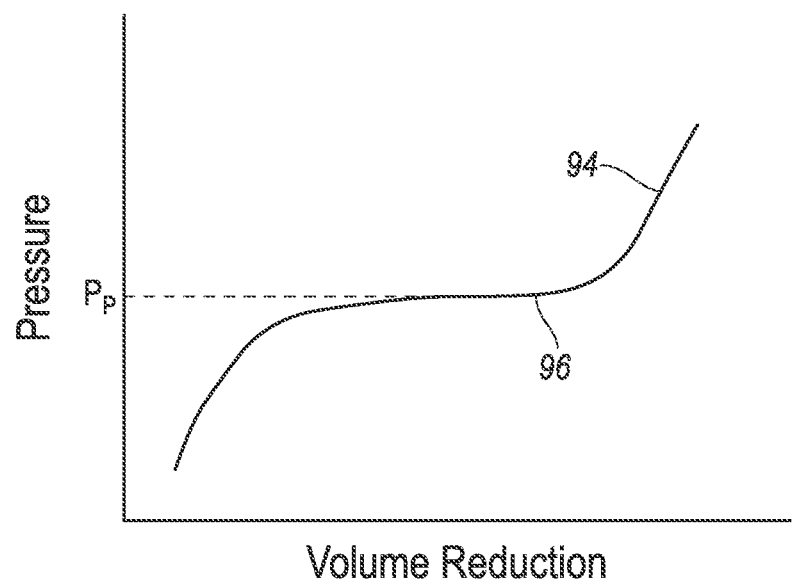
FIG. 6 is a graph of pressure in the resilient material versus volume reduction.

FIG. 6 is a graph of a curve 94 describing the relationship between a volume reduction of the resilient material 26 and a pressure experienced by the resilient material 26. As a volume occupied by the resilient material 26 decreases, i.e., when the resilient material 26 is compressed from the uncompressed state to the compressed state, the pressure initially increases relatively steeply. As the volume continues to decrease, the pressure nears a plateau pressure $P_P$ and does not increase or increases only relatively slowly, as shown over a plateau region 96 of the curve 94. Over the plateau region 96, the slope of the curve 94, that is, the rate of change of pressure per unit of volume reduction, is less than the slope of other regions of the curve 94. The plateau pressure $P_P$ may be at an inflection point of the curve 94 in the plateau region 96, that is, the point at which a change in the direction of curvature of the curve 94 occurs, that is, a point separating a region of the curve 94 with decreasing slope from a region of the curve 94 with increasing slope. After the plateau region 96, as the volume continues to decrease, the pressure rises more quickly than in the plateau region 96.

Figure 5B:
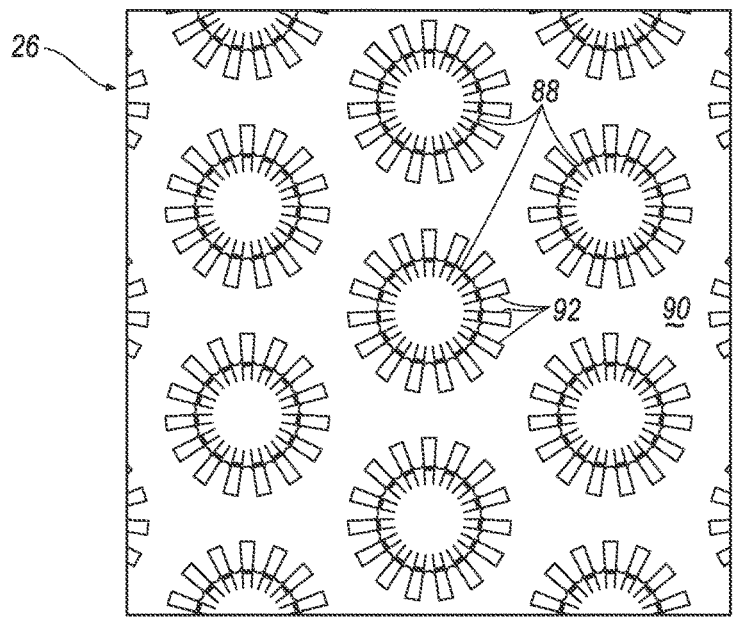
FIG. 5B is a diagram of the resilient material in the compressed state.

With reference to FIGS. 5A-5B, physically, before the volume reduces, i.e., in the uncompressed state, air fills the nanopores 92 of the particles 88, and surface tension prevents the liquid 90 from entering the nanopores 92, as shown in FIG. 5A. In the plateau region 96, i.e., in the compressed state, the pressure becomes sufficient to overcome the surface tension, and the liquid 90 enters the nanopores 92 and compresses the air inside the nanopores 92, as shown in FIG. 5B. Once the nanopores 92 are mostly full of the liquid 90, as the volume reduces, the pressure increases more substantially. The volume may be reduced by as much as 80%. The plateau pressure $P_P$ and the length of the plateau region 96 are affected by the choice of material for the particles 88, the average size of the particles 88, the number of nanopores 92 per particle, the average size of the nanopores 92, the surface treatment, and the choice of liquid.

The rotor 22 is movable from the first position in which the nanopores 92 are substantially filled with air, i.e., the uncompressed state, to the second position in which the nanopores 92 are substantially filled with the liquid 90, i.e., the compressed state. The volume of the resilient material 26 when the resilient material 26 is in the compressed state, i.e., when the rotor 22 is in the second position, may be at most half of the volume, i.e., half or less than half of the volume, e.g., as little as 20% of the volume, of the resilient material 26 when the resilient material 26 is in the uncompressed state, i.e., when the rotor 22 is in the first position. As the rotor 22 moves from the first position to the second position, the pressure in the resilient material 26 follows the curve 94 in FIG. 6; because the housing 20 has a constant cross-sectional area, the distance traveled by the rotor 22 is linearly related to the volume reduction.

The cavity 24 may lack outlets; in other words, no routes are provided for the resilient material 26 to escape the cavity 24. The compression of the resilient material 26 may be partially or fully reversible. As the pressure decreases, the air compressed in the nanopores 92 expands, and the volume occupied by the resilient material 26 expands.

With reference to FIG. 4, the device 16 may include an O-ring 98 disposed in the cavity 24 and abutting both the rotor 22 and the housing 20. The O-ring 98 may, for example, be disposed between the resilient material 26 and the helical interface 28. In other words, the O-ring 98 may be disposed adjacent to the inner surface 80 of the rotor 22. The O-ring 98 may form a seal between the rotor 22 and the housing 20. For example, the O-ring 98 may be sandwiched between the housing 20 and the rotor 22. In other words, the O-ring 98 may be compressed between the housing 20 and the rotor 22. The O-ring 98 may extend annularly about the axis A along the circumference 84 of the rotor 22. The O-ring 98 may be formed of any suitable material, e.g., rubber, plastic, etc.

With reference to FIGS. 2A-2B, the restraint system 14 may include a cable 100 extending from the seat belt buckle 18 to one of the housing 20 and the rotor 22, i.e., the device 16. In other words, the seat belt buckle 18 is spaced from the device 16. The cable 100 may, for example, be attached to both the seat belt buckle 18 and one of the housing 20 and the rotor 22. Specifically, the cable 100 may be attached to the rotor 22. In this situation, the cable 100 may be wrapped around the circumference 84 of the rotor 22 in the standard position, i.e., when the rotor 22 is in the first position. When the seat belt buckle 18 moves to the impact position, the cable 100 may be unwound from the circumference 84 of the rotor 22, i.e., when the rotor 22 is in the second position. In other words, the seat belt buckle 18, i.e., the cable 100, may cause the rotor 22 to move along the helical interface 28 from the first position to the second position. The cable 100 may be attached to the seat belt buckle 18 and one of the housing 20 and the rotor 22 in any suitable manner, e.g., adhesive, ultrasonic welding, etc.

The cable 100 may be formed of any suitable material. The cable 100 may be formed of a same or different material as the webbing 50. For example, the cable 100 may be formed of woven fabric, e.g., woven nylon. The cable 100 may extend any suitable amount from the rotor 22 to the seat belt buckle 18. For example, the cable 100 may limit the movement of the rotor 22 relative to the housing 20. In other words, the compression of the resilient material 26 may be limited by a length of the cable 100

The restraint system 14 may include any suitable number of devices 16, e.g., one or more. For example, the restraint system 14 may include one device 16. In this situation, the device 16 may be attached to one component of the restraint system 14, e.g., the seat belt buckle 18, the D-ring, the pretensioner, the anchor 52, etc. In other words, one device 16 may be attached to any suitable component of the restraint system 14. Alternatively, the restraint system 14 may include a plurality of devices 16. In this situation, each device 16 may be attached to any component of the restraint system 14, e.g., the seat belt buckle 18, the D-ring, the pretensioner, the anchor 52 etc.

The occupant may occupy the seat 12 with the seat belt buckle 18 in the standard position under normal operation conditions. During the vehicle impact, the vehicle 10 may be subjected to an impact force. The impact force may cause the vehicle 10 to decelerate faster than the occupant. During the vehicle impact, the restraint system 14 may increase the tension on the webbing 50, e.g., the retractor 48 may be in the locked state, to retain the occupant on the seat 12. In this situation, the momentum of the occupant may cause the restraint system 14, e.g., the webbing 50, to exert the force on the occupant. When the restraint system 14 exerts the force on the occupant, the device 16 may allow the seat belt buckle 18 to move from the standard position to the impact position. When the seat belt buckle 18 moves, the seat belt buckle 18 may pull, i.e., unwrap, the cable 100 from the circumference 84 of the rotor 22. In this situation, the cable 100 may move the rotor 22, i.e., rotate the rotor 22 relative to the housing 20 and the hole 70 of second side 66 of the bracket about the axis A. Additionally, the helical interface 28 may allow the rotor 22, i.e., the inner surface 80, to translationally move along the axis A towards the wall 78 of the housing 20. In this situation, the resilient material 26 may be compressed between the inner surface 80 of the rotor 22 and the wall 78 of the housing 20. For example, when the resilient material 26 is hydrophobic nanoporous particles 88, as described above, during compression of the resilient material 26, the liquid 90 may be forced into the nanopores 92 of the hydrophobic nanoporous particles 88. When the liquid 90 is forced into the nanopores 92, the resilient material 26 may absorb energy of the force exerted on the occupant by the restraint system 14. In this situation, the device 16 may assist in reducing the force exerted on the occupant and reducing injuries to the occupant.

After the vehicle impact, the device 16 may be reset. In other words, the device 16 may be reusable. In this situation, the cable 100 may be wrapped around the circumference 84 of the rotor 22 to move the seat belt buckle 18 from the impact position to the standard position. In this situation, the rotor 22, e.g., the inner surface 80, may translationally move relative to the housing 20 along the axis A away from the wall 78 of the housing 20. Additionally, the rotor 22 may move relative to the second side 66 of the bracket through the hole 70 along the axis A. In other words, the rotor 22 may move from the second position to the first position. When the rotor 22 moves away from the wall 78 of the housing 20, the liquid 90 may be released from the nanopores 92 of the hydrophobic nanoporous particles 88. In other words, the resilient material 26 may return to the uncompressed state.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A system comprising:
a housing and a rotor engaged with the housing, the housing and the rotor defining a cavity therebetween;
a resilient material disposed in the cavity;
a seat belt buckle connected to and moveable relative to one of the housing and the rotor; and a helical interface between the housing and the rotor, the rotor moveable relative to the housing along the helical interface by movement of the seat belt buckle.

2. The system of claim 1, further comprising a cable extending from the seat belt buckle to one of the housing and the rotor, the cable is attached to both the seat belt buckle and one of the housing and the rotor.

3. The system of claim 2, wherein the rotor includes a circumference, the cable is wrapped around the circumference of the rotor in a standard position.

4. The system of claim 3, wherein the cable is unwound from the circumference of the rotor in an impact position.

5. The system of claim 1, further comprising a bracket supporting both the housing and the rotor.

6. The system of claim 5, wherein the bracket includes a first side and a second side spaced from each other, the second side includes a hole sized to receive the rotor.

7. The system of claim 6, wherein the housing is disposed between the first side and the second side of the bracket, the housing is fixed to the first side of the bracket.

8. The system of claim 6, wherein the rotor extends through the hole of the second side of the bracket, the rotor is moveable relative to the hole of the second side of the bracket.

9. The system of claim 5, further comprising a seat, wherein the bracket is fixed to the seat.

10. The system of claim 5, further comprising a vehicle body, wherein the bracket is fixed to the vehicle body.

11. The system of claim 1, wherein the helical interface includes threads disposed on both the housing and the rotor, and the threads of the housing and the threads of the rotor are engageable with each other.

12. The system of claim 1, wherein the housing includes a tube extending annularly about an axis, the cavity extends circumferentially along the tube.

13. The system of claim 12, wherein the helical interface is in the cavity on the tube of the housing.

14. The system of claim 1, wherein the resilient material includes a liquid and hydrophobic nanoporous particles in the liquid.

15. The system of claim 1, wherein the resilient material abuts both the rotor and the housing in the cavity.

16. The system of claim 1, further comprising an O-ring disposed in the cavity, the O-ring abuts both the rotor and the housing.

17. The system of claim 16, wherein the O-ring is disposed between the resilient material and the helical interface.

18. The system of claim 1, further comprising a webbing engageable with the seat belt buckle.

19. A system comprising:
a housing and a rotor engaged with the housing, the housing and the rotor defining a cavity therebetween;
a helical interface between the housing and the rotor, the rotor being moveable relative to the housing along the helical interface;
a resilient material disposed in the cavity;
a seat belt buckle connected to and moveable relative to one of the housing and the rotor;
a cable extending from the seat belt buckle to one of the housing and the rotor, the cable is attached to both the seat belt buckle and one of the housing and the rotor; and
wherein the rotor includes a circumference, the cable is wrapped around the circumference of the rotor in a retracted position.

20. A system comprising:
a housing and a rotor engaged with the housing, the housing and the rotor defining a cavity therebetween;
a helical interface between the housing and the rotor, the rotor being moveable relative to the housing along the helical interface;
a resilient material disposed in the cavity;
a seat belt buckle connected to and moveable relative to one of the housing and the rotor;
wherein the housing includes a tube extending annularly about an axis, the cavity extends circumferentially along the tube; and
wherein the helical interface is in the cavity on the tube of the housing.

21. A system comprising:
a housing and a rotor engaged with the housing, the housing and the rotor defining a cavity therebetween;
a helical interface between the housing and the rotor, the rotor being moveable relative to the housing along the helical interface;
a resilient material disposed in the cavity;
a seat belt buckle connected to and moveable relative to one of the housing and the rotor;
an O-ring disposed in the cavity, the O-ring abuts both the rotor and the housing; and
wherein the O-ring is disposed between the resilient material and the helical interface.

* * * * *